No. 831,156. PATENTED SEPT. 18, 1906.
S. B. HART.
LOOSE HOPPER FOR SWINGING CONVEYERS.
APPLICATION FILED DEC. 16, 1904.
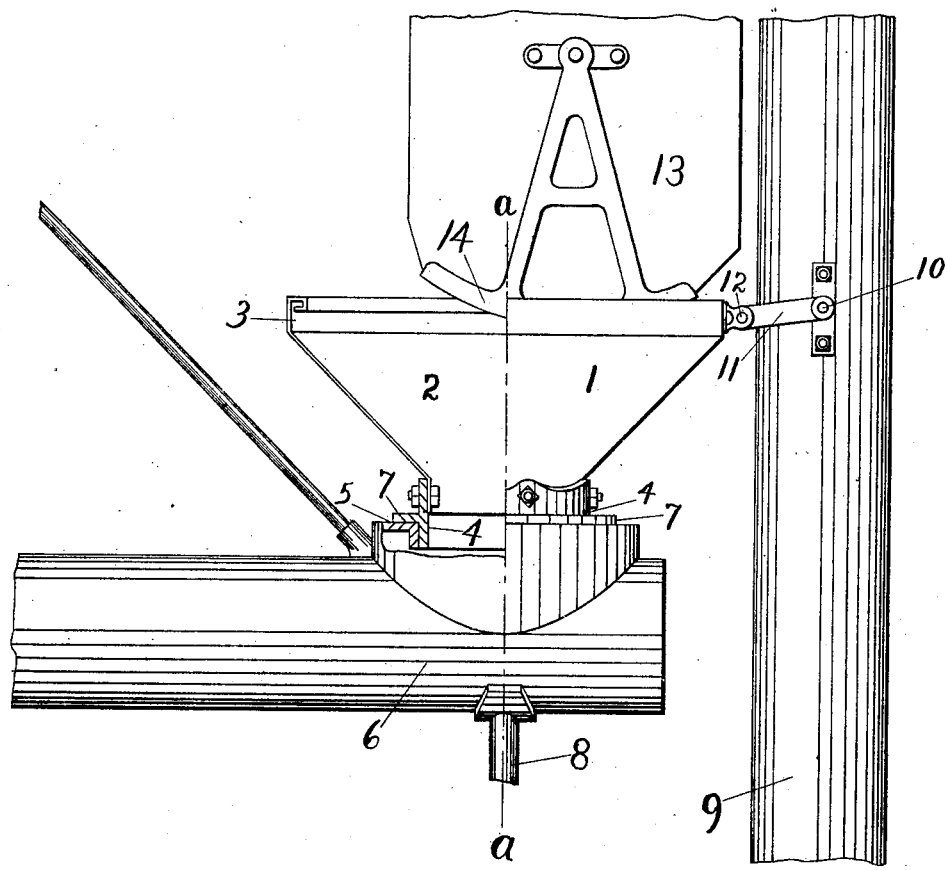
Witnesses:
E. W. Giles.
C. E. McNemar
Inventor.
Stacy B. Hart,
per W. V. Tefft.
Attorney.
THE NORRIS PETERS CO., WASHINGTON, D.C.

UNITED STATES PATENT OFFICE.

STACY B. HART, OF PEORIA, ILLINOIS, ASSIGNOR TO HART GRAIN WEIGHER CO., OF PEORIA, ILLINOIS, A CORPORATION OF ILLINOIS.

LOOSE HOPPER FOR SWINGING CONVEYERS.

No. 831,156.  Specification of Letters Patent.  Patented Sept. 18, 1906.

Application filed December 16, 1904. Serial No. 237,066.

*To all whom it may concern:*

Be it known that I, STACY B. HART, a citizen of the United States, residing at Peoria, in the county of Peoria and State of Illinois, have invented certain new and useful Improvements in Loose Hoppers for Swinging Conveyers; and I do hereby declare that the following is a full, clear, and exact description of the invention, which will enable others skilled in the art to which it appertains to make and use the same.

My invention relates to loose hoppers for swinging conveyers, and is designed particularly for use in connection with grain-elevators and automatic weigher devices, such as are commonly used on threshing-machines.

Swinging conveyers of the usual type used in connection with grain-elevators and automatic weigher devices have the hopper secured to and rotatable therewith. The rotation of the hopper with the conveyer, however, necessitates the use of an unusually large hopper to receive the deposit of grain from the weigher-bucket in every position it may assume in consequence of its rotation with the conveyer. Furthermore, the conveyer must be pivoted a considerable distance from the elevator device to allow free rotation of the hopper, and the weigher-bucket must be supported a corresponding distance from the elevator, so as to deposit within the hopper. As is evident, this construction does not make a compact and altogether satisfactory arrangement.

The object of my invention is to provide a swinging conveyer with a loose hopper supported thereon and held from rotation with the conveyer, and, further, in consequence of this construction to pivot the conveyer and support the weigher-bucket closer to the elevator, thus making a neater and more compact arrangement of the mechanism and parts than could otherwise be obtained.

In the accompanying drawing, which illustrates my invention, there is shown a side elevation of a hopper and a portion of the conveyer by which it is supported and with which it communicates, also portions of the adjacent elevator-tube and weigher-bucket, the portion at the left of the line *a a* being in vertical section.

1 of the drawing represents the exterior, and 2 the interior, of the hopper, the top 3 of which is substantially rectangular in shape and tapers to a circular portion 4 at the bottom, which said circular portion fits into a circular opening in the flat surface 5 of the conveyer 6, while the annular flange 7 on the circular portion 4 of the hopper rests upon the said flat surface 5 and supports the hopper on the said conveyer.

The conveyer 6 is pivoted by means of the support 8, so that the axis of rotation of the conveyer passes through the center of the opening in the flat surface 5 and is also so pivoted that when the hopper is in place on the conveyer one of the flat sides of the upper portion 3 fits close to the elevator-tube 9 and is connected thereto by means of the links 11, (one on each side of the elevator-tube 9,) pivotally connected to the elevator-tube, as at 10, and also pivotally connected to the hopper, as at 12. This connection with the elevator-tube prevents the hopper from rotating with the conveyer and secures an elastic or yielding vertical connection.

13 represents a portion of the weigher-bucket suspended above the hopper, and 14 the automatic gate controlling the flow of grain therefrom.

Having the hopper stationary, a much smaller hopper can be used and also can be placed very close to the elevator-tube, and consequently the weigher-bucket may be suspended very close to the elevator, making a compact structure.

The conveyer used with this hopper may be of any usual construction, either power or gravity conveyer, provided it is pivoted so as to allow rotation about the lower circular portion 4 of the hopper.

I am aware that swinging conveyers are and have been used in connection with grain-elevators and automatic weigher attachments; but they have the disadvantages above stated, which my invention eliminates.

I am also aware that grain-conveyers have been constructed rotating independently of their communicating hoppers; but I am not aware that a hopper has been constructed supported by the conveyer and allowing independent rotation of the said conveyer and used in connection with a grain-elevator and automatic weigher attachment in accordance with the construction and for the purpose above specified.

Having thus fully described my invention, what I claim, and desire to secure by Letters Patent of the United States, is—

1. The combination with a grain-elevator and weigher device, of a pivotally-mounted conveyer, a hopper loosely mounted on and supported by the conveyer, and means to hold the hopper from rotating with the conveyer, substantially as specified.

2. The combination with a grain-elevator and weigher device of a conveyer pivotally mounted on an under support, a hopper loosely mounted on and supported by the conveyer, and means to hold the hopper from rotating with the conveyer, substantially as specified.

3. The combination of a grain elevator and weigher device, of a conveyer pivotally mounted on an under support, a hopper loosely supported on and communicating with the conveyer, a flange adapted to support the hopper on the conveyer, and links pivotally connecting the hopper to the elevator, substantially as specified.

4. The combination with an elevator and automatic weigher attachment, of a conveyer-spout, a loose hopper supported on and by said conveyer, the latter having a lower portion inserted in an opening in the said conveyer, an annular flange on the said lower portion of the hopper, bearing on the rim of the said opening in the conveyer, and links connecting the said hopper to the elevator.

5. The combination with a swinging conveyer, of a stationary hopper supported thereby, provided with mechanism connected therewith to hold the said hopper from turning with the swinging of the conveyer.

6. The combination, with a pivoted grain-conveyer, of a non-rotatable hopper, a loose joint mechanism connecting said hopper with a suitable fixed object, substantially as described.

In testimony whereof I have affixed my signature in presence of two witnesses.

STACY B. HART.

Witnesses:
J. E. DE VRIES,
W. B. HILDE.